United States Patent
Goulet et al.

[11] Patent Number: 5,810,054
[45] Date of Patent: Sep. 22, 1998

[54] TUBING END AND METHOD FOR FORMING

[75] Inventors: Douglas P. Goulet, Big Lake; Adelbert L. Schurman, New Hope, both of Minn.

[73] Assignee: IMI Cornelius Inc., Anoka, Minn.

[21] Appl. No.: 761,178

[22] Filed: Dec. 6, 1996

Related U.S. Application Data

[60] Provisional application No. 60/008,296 Dec. 8, 1995.

[51] Int. Cl.⁶ ..................................... F16L 9/00
[52] U.S. Cl. ........................... 138/109; 138/177; 72/367
[58] Field of Search .................... 138/109, 155, 138/177; 285/918; 72/367–370

[56] References Cited

U.S. PATENT DOCUMENTS

| | | | |
|---|---|---|---|
| 2,652,895 | 9/1953 | Arrowood | 285/918 X |
| 3,000,424 | 9/1961 | Weise | 72/369 |
| 4,362,187 | 12/1982 | Harris et al. | 138/109 |
| 4,850,621 | 7/1989 | Umehara | 285/918 X |
| 5,096,231 | 3/1992 | Chisnell et al. | 285/918 X |
| 5,103,666 | 4/1992 | Schroeder | 72/396 X |
| 5,105,854 | 4/1992 | Cole et al. | 138/109 |
| 5,472,016 | 12/1995 | Szabo | 138/109 X |

FOREIGN PATENT DOCUMENTS 417245  1/1967  Switzerland ............ 285/918

*Primary Examiner*—Patrick F. Brinson
*Attorney, Agent, or Firm*—Sten Erik Hakanson

[57] ABSTRACT

The present invention comprises a tubing end fitting and a method of forming thereof wherein the fitting is formed out of the tubing itself. In a first step, the tubing end is compressed in a linear direction and shortened forming a first annular ridge extending around the tubing spaced from the end of the tube by a small tube portion. At the same time, the small tube portion diameter is reduced slightly. The small tube end portion is again compressed slightly in a linear direction initiating the formation of a second annular ridge spaced from the first annular ridge, while at the same time again slightly reducing the diameter of the remaining tubing end portion. In a third step the tubing end is again compressed in a linear direction completing the formation of the second annular ridge. In a fourth step the remaining tube end portion is flared outwardly forming an o-ring receiving groove between the second annular ridge and the tube end.

4 Claims, 3 Drawing Sheets

TUBING END AND METHOD FOR FORMING

This application claims benefit of Provisional app. No. 60/008,296, filed Dec. 8, 1995.

FIELD OF THE INVENTION

The present invention relates generally to tubing end forming, and in particular to end forming of tubing for forming a fluid tight connection.

BACKGROUND OF THE INVENTION

Beverage dispensing machines that utilize a cooled water bath for cooling of the beverages dispensed therefrom are well known in the art. The beverages, or their constituents, such as a syrup component and a carbonated water component as found in a dispenser of the post-mix type, are cooled by flowing through heat exchange coils or tubing located in the dispenser water bath. Such tubing is typically made of stainless steel and is submerged in the water bath so as to cool the beverage to the desired temperature as it flows from a source thereof to the dispensing valve. In the prior art, such tubing includes end fittings for facilitating a leak free connection with each beverage dispensing valve. However, such fittings have to be separately machined and then welded on to each tube end, thereby contributing considerably to the cost of manufacture of the resultant heat exchange tube.

SUMMARY OF THE INVENTION the present invention comprises a tubing end fitting and a method of forming thereof wherein the fitting is formed out of the tubing itself. In a first step, the tubing end is compressed in a linear direction and shortened forming a first annular ridge extending around the tubing spaced from the end of the tube by a small tube portion. At the same time, the small tube portion diameter is reduced slightly. The small tube end portion is again compressed slightly in a linear direction initiating the formation of a second annular ridge spaced from the first annular ridge, while at the same time again slightly reducing the diameter of the remaining tubing end portion. In a third step the tubing end is again compressed in a linear direction completing the formation of the second annular ridge. In a fourth step the remaining tube end portion is flared outwardly forming an o-ring receiving groove between the second annular ridge and the tube end.

In operation, an o-ring is placed in the o-ring receiving groove and the tube end is inserted into the beverage valve. The tubing is held in the valve by a variety of attachment valve means well known in the art. The o-ring provides for a liquid tight seal and the first annular ridge serves to limit any unwanted movement between the valve and the tube that could compromise the fluid tight seal there between.

DESCRIPTION OF THE DRAWINGS

A better understanding of the structure, function and objects and advantages of the present invention can be had by reference to the following detailed description which refers to the following FIGURES, wherein.

DETAILED DESCRIPTION

Figure 1:
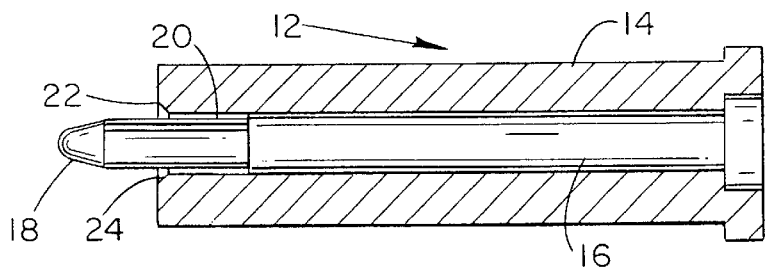
FIG. 1 shows a side plan cross-sectional view of a first tube end forming tool.
Figure 2:
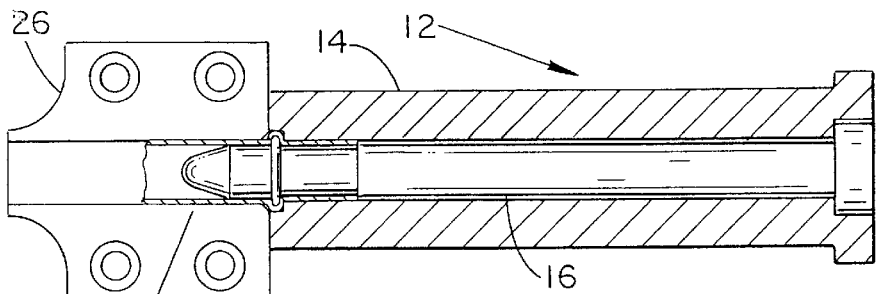
FIG. 2 show a side plan cross-sectional view of the tool of FIG. 1 with the tube end therein.
Figure 3:
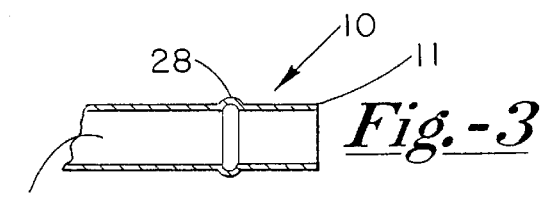
FIG. 3 shows a side plan cross-sectional view of the tube end after the forming action of the tool of FIG. 1.

A heat exchange tube is seen in the various FIGURES and indicated by the numeral 10. Tube 10 includes an interior 10a and an end point 11. The process of forming the tube end can be understood by the sequence thereof as disclosed in FIGS. 1–12. Tube end forming, as is understood by those of skill, typically involves a tube end forming machine having one or more specially designed tools mountable thereon for working the tube end into the desired shape by cold forming linear interaction of the tool with the tube end. Thus, the tube end forming machine is typically hydraulically powered to provide sufficient force for the cold forming, and includes a primary clamp to hold the tube in place and one or more secondary clamps to assist in the forming process. As seen in FIG. 1, a first tool 12 includes body 14 having an interior mandrel 16 secured and extending axially therein. Mandrel 16 extends beyond body 14 ending in a tip end 18. An annular space 20 is defined between body 14 and mandrel 16. An annular groove 22 is formed in body 14 at the open end thereof, and body 14 also includes an annular angled shoulder 24 between groove 22 and space 20. In the first step of the tube end forming process of the present invention, tube 10 is held in a clamp 26 wherein short portion 11 thereof extends outwardly of clamp 26 in the direction of tool 12. Tool 12 is then moved in the direction of arrow A of FIG. 2, wherein mandrel 16 is inserted into tube interior 10a and tube end 11 is inserted into annular groove 20. Annular space 20 serves to reduce the diameter of that portion of the end of tube 10 positioned therein compared to the nominal or original diameter thereof. Angled shoulder 24 serves to guide tube end 11 into annular space 20 and effect the diameter reduction. Simultaneously, tube 10 is reduced in length by the formation of a first annular ridge 28 that is sized by annular groove 22. As a result of the foregoing first step tube 10 take on the conformation seen in FIG. 3.

Figure 4:
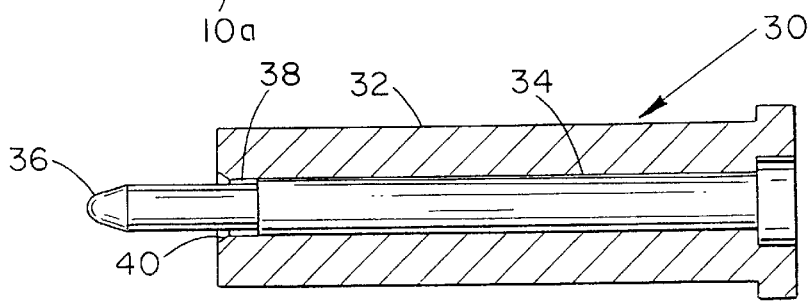
FIG. 4 shows a side plan cross-sectional view of a second tube end forming tool.
Figure 5:
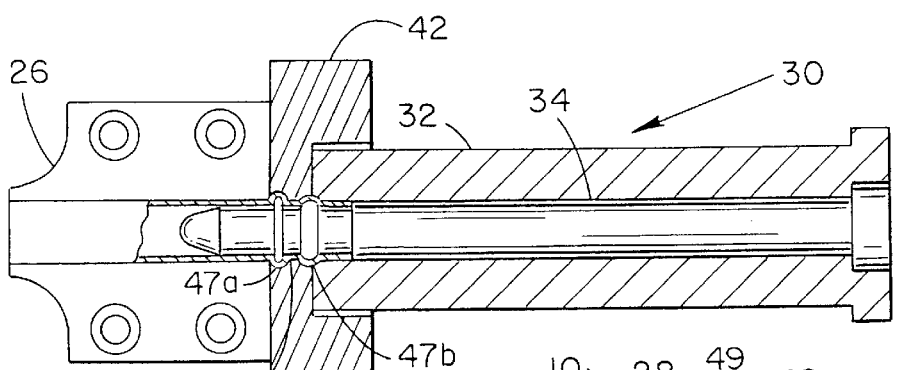
FIG. 5 show a side plan cross-sectional view of the second tool of FIG. 4 with the tube end therein.
Figure 6:
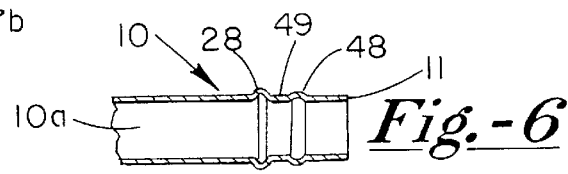
FIG. 6 shows a side plan cross-sectional view of the tube end after the forming action of the second tool.

As seen in FIGS. 4 and 5, a second tool 30 includes a body 32 having an interior mandrel 34 secured and extending axially therein. Mandrel 34 extends beyond body 32 ending in a tip end 36. An annular space 38 is defined between body 32 and mandrel 34. An annular angled shoulder 40 is formed in body 32 at the open end thereof. A secondary clamp 42 is positioned between clamp 26 and tool 30 and includes working surfaces each having a raised central portion 46 extending beyond lower portions 47a and 47b. In the second step of the tube end forming process of the present invention, tube 10 is still held in a clamp 26 and tool 12 is withdrawn. Tool 30 positioned to be moved linearly in place of tool 12 in the same direction A. Secondary clamp 42 is closed onto tube end 11 prior to linear operation of tool 11. Mandrel 32 is inserted into tube interior 10a, tip end 36 providing guiding therein, and tube end 11 is inserted into space 38 effecting a further downsizing of the diameter of that portion of tube 10 residing therein. As with tool 12, shoulder 40 of tool 30 facilitates this insertion into space 40 and subsequent downsizing. Simultaneously, the formation of a second annular ridge 48 and first annular groove 49 is initiated leaving tube 10 in the conformation as seen in FIG. 6. Secondary clamp surfaces 44 can be understood to be contoured to the desired surface structure of tube 10 at this second step for facilitating the formation of tube end 11 into the shape as seen in FIG. 6. In particular, ridges 46 serve the formation of annular groove 49 and ridge 48.

Figure 7:
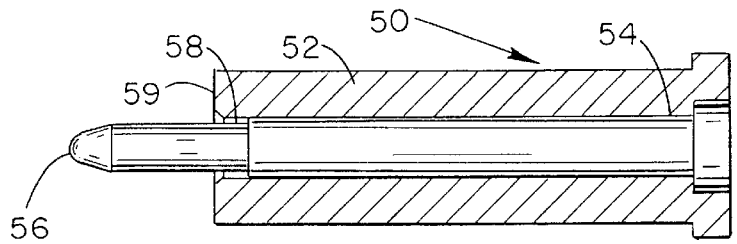
FIG. 7 shows a side plan cross-sectional view of a third tube end forming tool.
Figure 8:
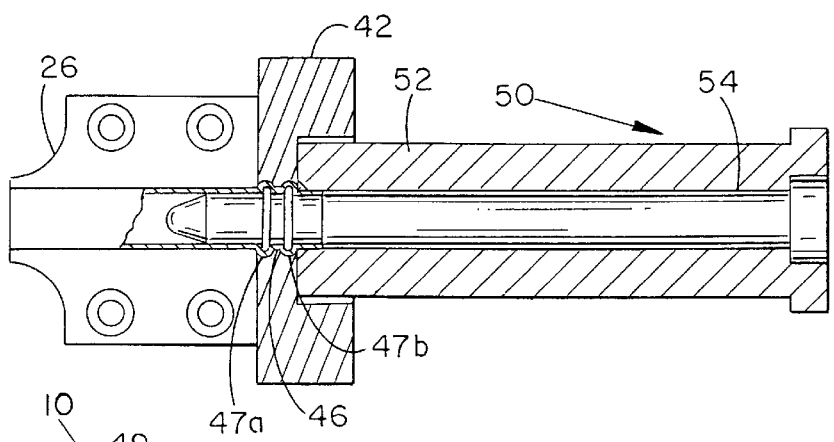
FIG. 8 show a side plan cross-sectional view of the third tool of FIG. 7 with the tube end therein.
Figure 9:
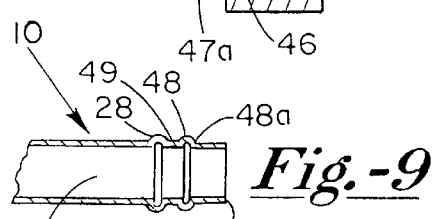
FIG. 9 shows a side plan cross-sectional view of the tube end after the forming action of the third tool.

As seen in FIGS. 7 and 8, a third tool 50 includes a body 52 having an interior mandrel 54 secured and extending axially therein. Mandrel 54 extends beyond body 52 ending in a tip end 56. An annular space 58 is defined between body 52 and mandrel 54. Body 52 has a flat annular end surface 59. In the third step of the tube end forming process of the present invention as represented in FIG. 8, tube 10 is remains held in a clamp 26 and clamp 42 also remains closed. Tool 30 is withdrawn and tool 50 is positioned to be moved linearly in its place in the same direction A. Mandrel 52 is inserted into tube interior 10a guided by end 56, and tube end 11 is inserted into space 58. Tool 50 does not downsize the diameter of tube end 11, but is used to finish ridge 48 making it narrower and having a more sharply defined and flat interior edge 48a. This ridge finishing is facilitated by flat surface 59. Tube 10 then take on the conformation as represented in FIG. 9. It can be understood that surfaces 46 and 47a and 47b serve to facilitate this final surface contour.

Figure 10:
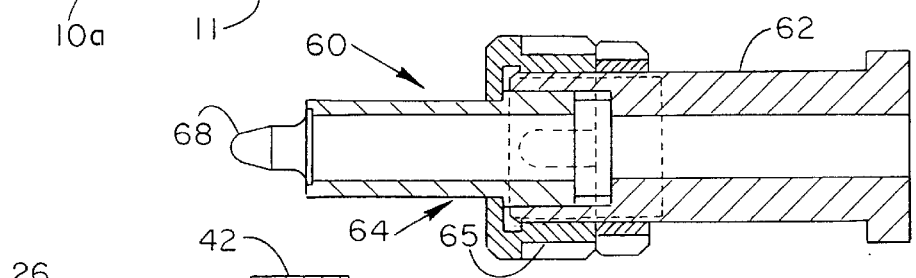
FIG. 10 shows a side plan cross-sectional view of a fourth tube end forming tool.
Figure 11:
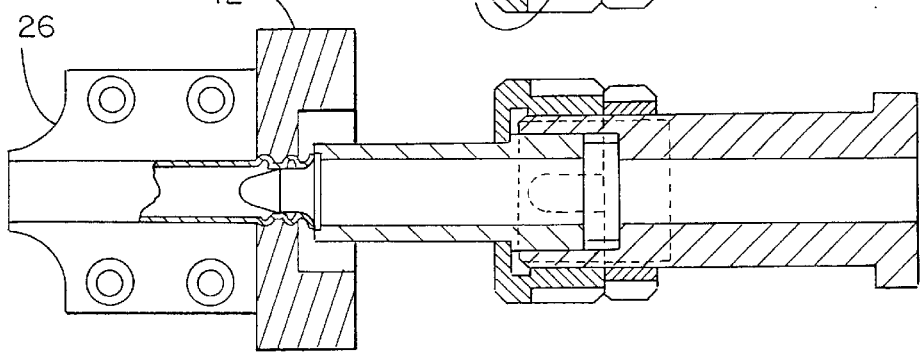
FIG. 11 show a side plan cross-sectional view of the fourth tool of FIG. 10 with the tube end therein.
Figure 12:
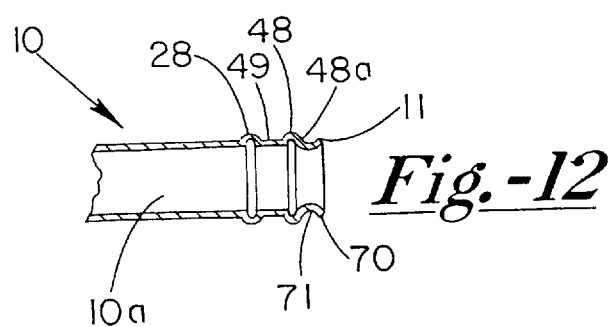
FIG. 12 shows a side plan cross-sectional view of the tube end after the forming action of the fourth tool.

As seen in FIGS. 10 and 11 a fourth tool 60 includes a standard base 62 to which a plurality of different working heads 64 can be attached by a nut 65 threadably securable to base 62. Head 62 includes a central mandrel 66 ending in a flaring tip end 68. In the fourth and final step in the manufacture of the integral tube end fitting of the present invention, tool 50 is withdrawn and tool 60 reinserted in its place. As with the previous steps, clamp 26 continues to hold tube 10 and clamp 42 remains closed. As tip end 68 is guided into tube interior 10a it provides for the formation of a flared end 70 and an o-ring retaining annular groove 71. Tube 10 then takes on the conformation as seen in FIG. 12.

Figure 13:
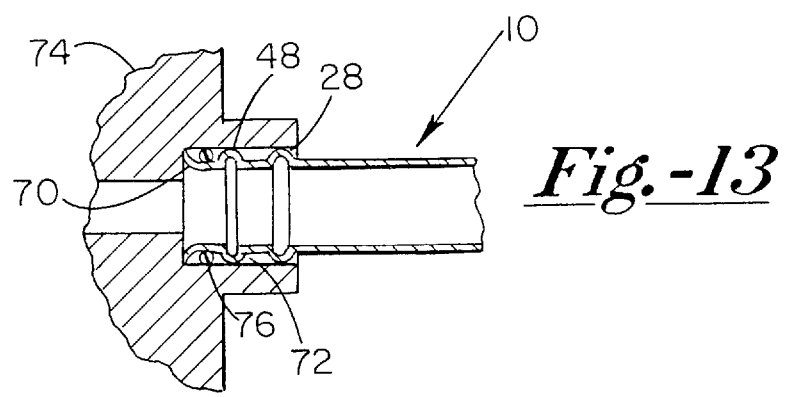
FIG. 13 shows a cross-sectional view of the tube end of the present invention in a beverage valve.

Tube 10 can then be used for fluid sealing with a suitable receiving fitting or orifice. For example, as seen in FIG. 13, tube 10 can be inserted into a fitting receiving orifice 72 of a beverage dispensing valve 74. Prior to insertion therein an 0-ring 76 is fit around annular groove 71. It can be understood that the finishing of ridge 48 in step 3 wherein a more sharply defined edge 48a was produces was done to provide for better seating and retention of o-ring 76 in groove. Annular ridge 28 serves to prevent any unwanted movement of tube 10 in orifice 72 by its contact with the internal perimeter surface thereof. As is well known in the art, tube 10 is rigidly held in a beverage dispensing device and valve 74 is secured to that device so as to maintain the proper position and connection between tube 10 and orifice 72.

We claim:

1. A method for forming an end portion of a tube, the steps comprising:

reducing the length of the tube for forming a first arcuate annular ridge therein by a first compression thereof wherein an equal force is applied to the exterior surface of the tube during the first compression thereof except along a portion of the length thereof where it is desired to form the first arcuate annular ridge therein, reducing the length of the tube a second time for forming a second arcuate annular ridge therein spaced from the first arcuate annular ridge by a first annular groove by a second compression thereof wherein an equal force is applied to the exterior surface of the tube during the second compression thereof except along a portion of the length thereof where it is desired to form the second arcuate annular ridge therein, and the second arcuate annular ridge closer to an end of the tube than the first arcuate annular ridge and the first and second arcuate annular ridges extending outward of a nominal surface of an unworked portion of the tube by an equal distance, and outwardly flaring the end of the tube for forming an o-ring receiving groove between the second arcuate annular ridge and the tube end.

2. A tube having an end fitting formed in a connection end portion thereof, comprising:

a first arcuate annular ridge spaced from an end point of the connection end portion, a second arcuate annular ridge formed on the connection end portion between the first arcuate annular ridge and the end point of the tube connection end portion, and the first and second arcuate annular ridges defining a first annular groove there between and the first and second arcuate annular ridges extending outward an equal distance beyond a nominal surface diameter of the tube, and an outwardly flared portion between the second arcuate annular ridge and the tube end point for forming an o-ring receiving annular groove there between.

3. The method for forming a tube end as defined in claim 1, and further including the step of further compressing the second arcuate annular ridge prior to outwardly flaring the end of the tube so that the second arcuate annular ridge is narrower than the first arcuate annular ridge and has a sharply defined substantially flat interior ridge surface facing toward the tube end.

4. The tube as defined in claim 2, and the second arcuate annular ridge being narrower than the first arcuate annular ridge and having a sharply defined substantially flat interior ridge surface facing toward the tube end point.

* * * * *